June 10, 1930. H. A. ANDERSEN 1,762,376
DRINK MIXER
Filed Jan. 28, 1929    2 Sheets-Sheet 2
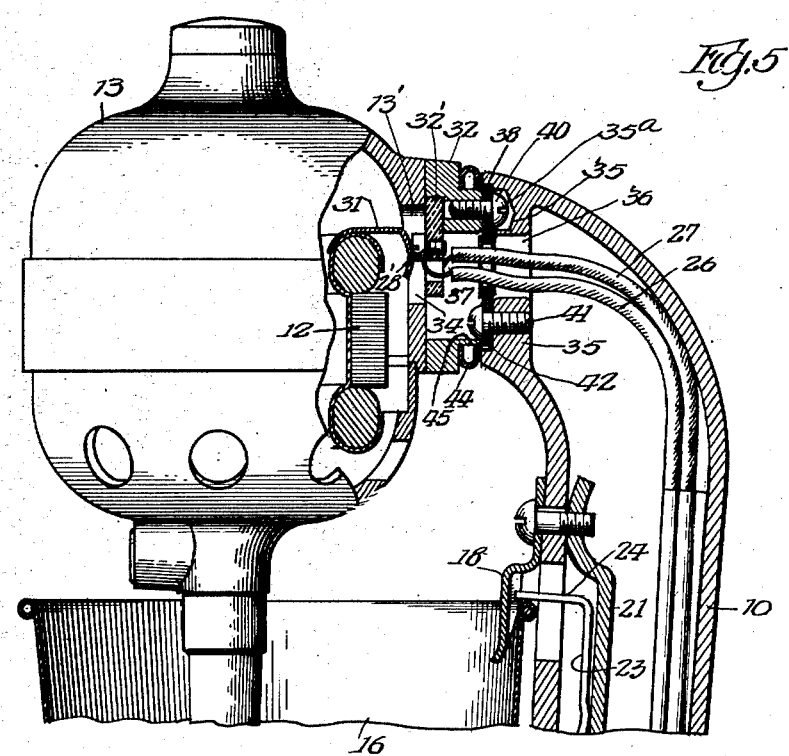
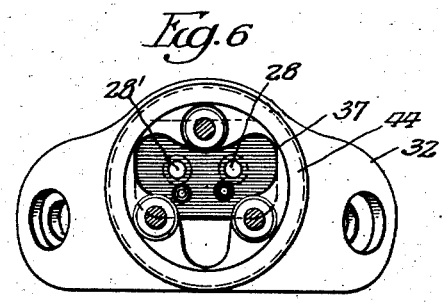
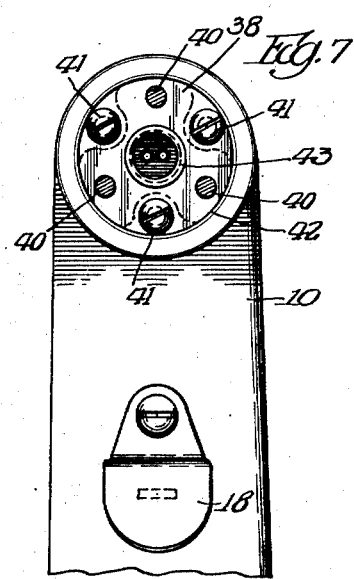
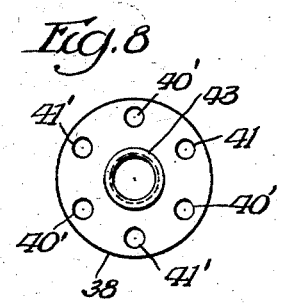
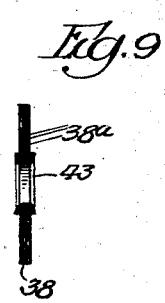
Inventor
Harry A. Andersen
By Fred Gerlach
his Atty.

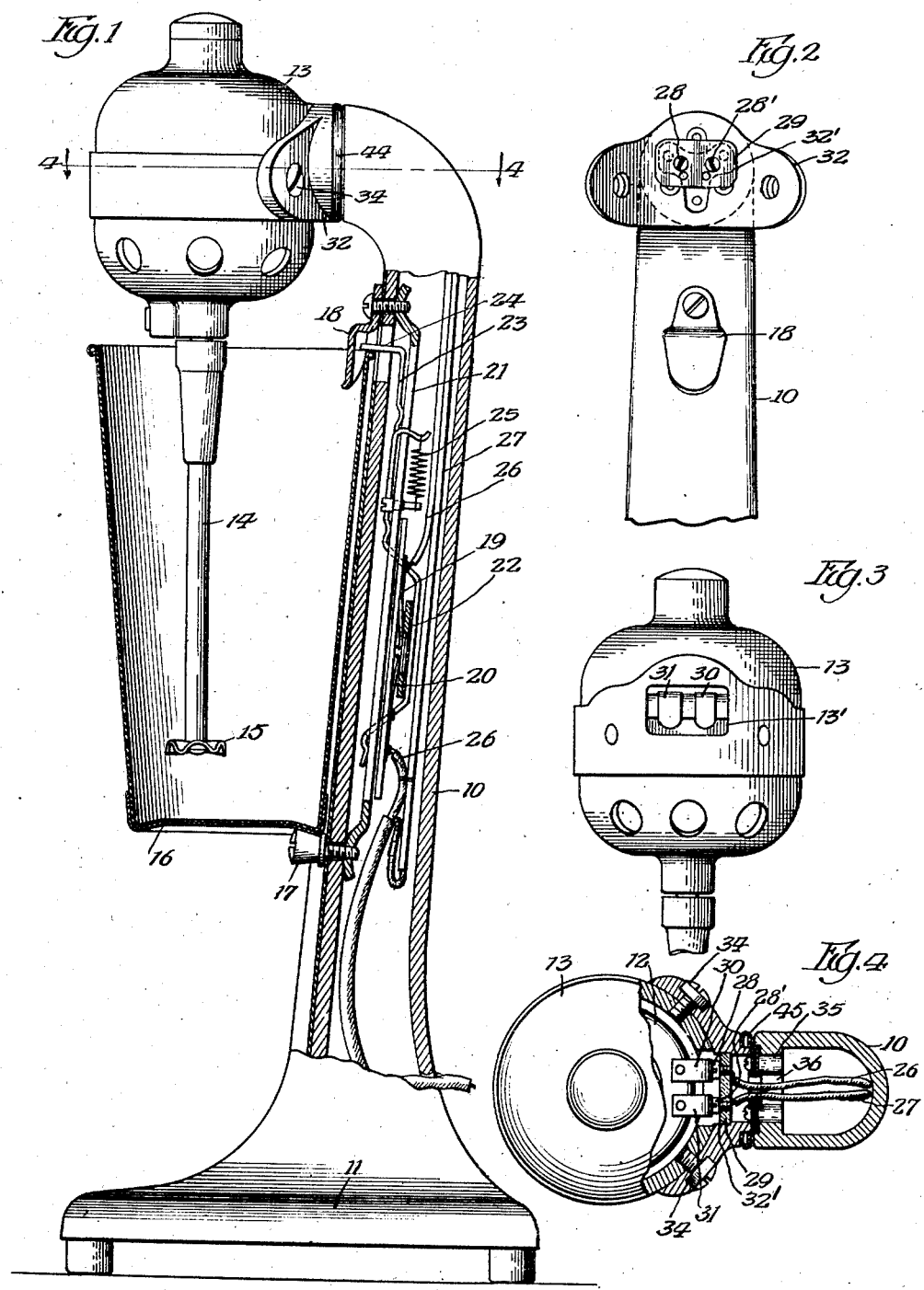

Patented June 10, 1930

1,762,376

UNITED STATES PATENT OFFICE

HARRY A. ANDERSEN, OF RACINE, WISCONSIN, ASSIGNOR TO HAMILTON BEACH MANUFACTURING COMPANY, OF RACINE, WISCONSIN, A CORPORATION OF WISCONSIN

DRINK MIXER

Application filed January 28, 1929. Serial No. 335,536.

The present invention relates generally to devices for mixing beverages. More particularly the invention relates to electric drink mixers of the type that comprises an electric motor which is supported at the top of a standard and embodies a depending agitator shaft around which a receptacle containing the material to be mixed is adapted to be placed.

In drink mixers, of the aforementioned type, it is desirable to prevent the agitator shaft from being bent as the result of impact in placing the receptacle into and out of its operative position around the agitator.

One object of the invention is to provide an electric drink mixer of the character under consideration embodying a mount for the motor which is an improvement upon those previously designed and operates to support the motor so that it is free to yield slightly when the agitator is struck by the receptacle or otherwise.

Another object of the invention is to provide an improved resilient or yielding mount which is adapted to support the motor of an electric drink mixer in such a manner that the agitator-shaft after being bent is automatically restored, during drive of the motor, to its true axis in response to the action of the centrifugal force.

A further object of the invention is to provide a resilient mount for an electric drink mixer motor, which comprises a resilient or spring plate that serves to support the motor in a substantially fixed position, but is sufficiently yieldable to deaden the noise resulting from the high speed rotation of the rotor of the motor.

Other objects of the invention and the various advantages and characteristics of the present drink mixer construction will be apparent from a consideration of the following detailed description.

The invention consists in the several novel features hereinafter set forth and more particularly defined by claims at the conclusion hereof.

In the drawings which accompany and form a part of this specification or disclosure and in which like numerals of reference denote corresponding parts throughout the several views: Fig. 1 is a side elevation of a drink mixer embodying the invention, parts being shown in section for illustrative purposes. Fig. 2 is a front view of the supporting standard. Fig. 3 is a rear view of the motor casing. Fig. 4 is a section taken on the line 4—4 of Fig. 1. Fig. 5 is a vertical section on an enlarged scale through the resilient connection between the supporting standard and the motor. Fig. 6 is a rear view of the bracket that extends between the standard and the motor casing. Fig. 7 is a view of the supporting standard, illustrating the manner in which the resilient plate of the yielding connection or mount is held therein. Figs. 8 and 9 are details of the resilient plate.

The invention is exemplified in a drink mixer comprising a supporting standard 10 which is provided with a hollow base 11; an electric motor 12 which is contained in a suitable casing 13; a shaft 14 which is secured to and depends from the rotor of the motor and is provided at its lower end with an agitator 15; a receptacle 16 which is adapted to be held around the agitator; a retaining device which operates to hold the receptacle in its operative position around the agitator-shaft and comprises a stud 17 on which the bottom of the receptacle is adapted to rest, and a hook 18 which is adapted to extend into the top of the receptacle; and a switch which operates to control automatically the operation of the motor and comprises contacts 19 and 20 which are mounted on, and insulated from, a supporting bar 21, an a bridge-contact 22 that is fixed to a member 23 which is slidable on the bar 21, and is provided at its upper end with a finger 24 for engaging the rim of the receptacle. A spring 25 is applied to member 23 to open the switch when the finger 24 is released upon removal of the receptacle from the retaining device. Contacts 19 and 20 are included in a conductor 26 a branch of which leads from contact 19 to the motor. A conductor 27 leads from the line to the motor. Conductors 26 and 27 extend upwardly through the standard, and are connected to contact screws 28 and 28′ which are secured in a plate 29 of insulating material. These screws are adapted to engage fixed contacts 30 and 31 which are suitably connected to the field windings of the motor in the housing 13. Plate 29 is confined in a recess 32' in the front of a bracket 32 and is held therein by the motor casing. The bracket 32 fits around the rear portion of the motor casing, and is removably secured thereto by screws 34. When these screws are removed, the motor casing can be separated from the bracket so the plate 29 will be accessible. An opening 13' is formed in the motor casing through which contacts 30 and 31 extend to engage contact screws 28, 28' when the casing and bracket are secured together. The upper end of the standard extends forwardly and has formed therein an integral vertical wall 35. This wall and the bracket 32 have openings 36, and 37 formed therein respectively, through which conductors 26, 27 pass. Plate 29 has openings through which the conductors pass so that they may be clamped on the front of the plate by screws 28, 28'.

The improved resilient mount for the motor consists of a spring plate or diaphragm 38 which is secured to the back of bracket 32 by three screws 40 which pass through holes 40' in the diaphragm and are threaded to said bracket. The diaphragm is secured at three intermediate points to wall 35 of the standard by three screws 41 which pass through holes 41' in the diaphragm, and are threaded to said wall 35. The diaphragm consists of a series of circular disks 38ª of spring metal which fit in a recess 42 in the front of the standard, and are secured together by a central hollow rivet 43. The conductors 26 and 27 extend through said rivet. The wall 35 has enlarged recesses 35ª, in which the heads of screws 40 are free to move when the diaphragm is flexed. By thus securing the diaphragm to the standard and the bracket, the portions between screws 41 are free to be flexed to permit relative movement between bracket 32 and the standard. The inherent elasticity of the diaphragm tends normally to hold the bracket in a predetermined position, and retracts the bracket to said position when the diaphragm is released after being flexed. As a result, the motor and bracket are yieldingly supported, so that when the motor is stressed, or the agitator is struck, the portions of the diaphragm between screws 41 will yield in the direction of the stresses and prevent damage to the agitator shaft. A ferrule 44 around an annular portion 45 of bracket 32 is loosely fitted between the column and the bracket.

In assembling the mixer, the diaphragm is first secured by screws 40 to bracket 32. The latter is then secured by screws 41 to the standard. Plate 29 is then placed in recess 32' and the conductors are secured thereto by contact screws 28, 28'. Next, the motor casing is secured by screws 34 to the bracket 32, whereupon the motor will be resiliently mounted on the standard and electrically connected to the conductors through contacts 19 and 20.

When the motor, thus mounted, is in use, it will be resiliently supported so it and the agitator shaft may yield when stressed or struck. This resiliency is usually sufficient to prevent the agitator from being bent as the result of stresses or blows. It also minimizes the vibration or noise caused by the operation of the motor at high speeds, and, furthermore, if the agitator is out of true alignment, the rotation at high speed will tend to restore it to its true axial position or alignment.

The invention exemplifies a resilient mount for a drink mixer motor, which is efficient in operation, can be readily dismantled for repair or replacement, and is simple in construction.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a drink mixer, the combination of a rigid support, an electric motor, an agitator driven by the motor, and means for connecting the motor to said support comprising a single resilient diaphragm having a portion thereof fixedly secured to the motor and another portion fixedly secured to the support.

2. In a drink mixer, the combination of a rigid support, an electric motor comprising a casing, an agitator-shaft depending from and driven by the motor, a bracket removably secured to the motor casing, and means for connecting the motor to the support comprising a resilient diaphragm confined between the support and the bracket.

3. In a drink mixer, the combination of a rigid support, an electric motor comprising a casing, an agitator-shaft depending from and driven by the motor, a bracket removably secured to the motor casing, and means for connecting the motor to the support comprising a resilient diaphragm removably secured to the support and to the bracket.

4. In a drink mixer, the combination of a rigid support, an electric motor comprising a casing, an agitator-shaft depending from and driven by the motor, a bracket removably secured to the motor casing, and means for connecting the motor to the support, comprising a resilient diaphragm enclosed between the support and the bracket.

5. In a drink mixer, the combination of a rigid supporting standard, an electric motor comprising a casing, an agitator-shaft suspended from and driven by the motor, a bracket, and a supporting connection between the bracket and the upper end of the standard comprising a flexible diaphragm having different portions secured to the bracket and the standard to permit its intermediate portions to flex.

6. In a drink mixer, the combination of a rigid supporting standard, an electric motor comprising a casing, an agitator-shaft suspended from and driven by the motor, a bracket removably secured to the motor casing, and a supporting connection between the bracket and the upper end of the standard comprising a flexible diaphragm disposed between the bracket and the standard and having different portions secured to the bracket and the standard to permit its intermediate portions to flex.

7. In a drink mixer, the combination of a rigid supporting standard, an electric motor comprising a casing, an agitator-shaft suspended from and driven by the motor, a bracket removably secured to the motor casing, and a supporting connection between the bracket and the upper end of the standard comprising a flexible diaphragm, screws for securing portions of the diaphragm to the bracket, and screws for securing other portions of the diaphragm to the standard.

8. In a drink mixer, the combination of a rigid support, an electric motor, a depending agitator shaft driven by the motor, and means for yieldingly connecting the motor to the support, comprising a diaphragm composed of a plurality of spring-metal plates.

9. In a drink mixer, the combination of a rigid support, an electric motor, a depending agitator shaft driven by the motor, and means for yieldingly connecting the motor to the support, comprising a diaphragm composed of a plurality of spring-metal plates and a hollow rivet.

10. In a drink mixer, the combination of a rigid supporting standard, having a forwardly extending upper end, an electric motor having a casing, an agitator shaft depending from and driven by the motor, a bracket to which the back of the motor casing is removably secured, and resilient means for connecting the back of the bracket to the upper end of the standard.

11. In a drink mixer, the combination of a rigid supporting standard, an electric motor having a casing, an agitator shaft depending from and driven by the motor, a bracket to which the motor casing is removably secured, separable contacts carried by the bracket and in the motor casing respectively, conductors leading to the contacts carried by the bracket, and a resilient connection between the bracket and the standard.

12. In a drink mixer, the combination of a rigid supporting standard, an electric motor comprising a casing, an agitator shaft depending from and driven by the motor, a bracket to which the motor casing is removably secured, contacts in the casing, contacts carried by the bracket and engageable with the contacts in the casing, conductors leading to the contacts carried by the bracket, and a resilient connection between the bracket and the standard.

13. In a drink mixer, the combination of a rigid supporting standard, an electric motor comprising a casing, an agitator shaft driven by and depending from the motor, a bracket to which the motor casing is removably secured, contacts carried by the motor, a plate removably held in the bracket, separable contacts carried by the plate, engageable with conductors leading to the contacts on the plate, and a resilient connection between the bracket and the standard.

14. In a drink mixer, the combination of a rigid supporting standard, an electric motor comprising a casing, an agitator shaft driven by and depending from the motor, a bracket to which the motor casing is removably secured, separable contacts carried by the bracket and the motor casing respectively, conductors leading to the contacts carried by the bracket, and a resilient diaphragm between the bracket and the standard having an opening through which the conductors pass.

15. In a drink mixer, the combination of a rigid supporting standard, an electric motor having a casing, an agitator shaft depending from and driven by the motor, a bracket to which the motor casing is removably secured, separable contacts carried by the bracket and the motor casing, conductors leading to the contacts carried by the bracket, and means for connecting the bracket to the support comprising a resilient diaphragm having portions thereof respectively secured to the bracket and to the standard.

Signed at Racine, Wisconsin, this 23rd day of January, 1929.

HARRY A. ANDERSEN.

DISCLAIMER 1,762,376.—*Harry A. Andersen*, Racine, Wis. DRINK MIXER. Patent dated June 10, 1930. Disclaimer filed May 23, 1931, by the assignee, *Hamilton Beach Manufacturing Company*.

Hereby enters this disclaimer, to-wit:

(1) To the combination of claim 2, except where in such combination the diaphragm has one portion thereof fixedly secured to the bracket and another portion thereof fixedly secured to the support.

(2) To the combination of claim 3, except where in such combination the diaphragm has one portion thereof fixedly secured to the bracket and another portion thereof fixedly secured to the support.

(3) To the combination of claim 4, except where in such combination the diaphragm has one portion thereof fixedly secured to the bracket and another portion thereof fixedly secured to the support.

(4) To the combination of claim 10, except where in such combination the resilient means has a portion thereof fixedly connected to the bracket and another portion fixedly secured to the standard.

[*Official Gazette June 16, 1931.*]